United States Patent
Harris

(10) Patent No.: US 7,856,827 B2
(45) Date of Patent: Dec. 28, 2010

(54) STRUCTURAL TRACK SUPPORT OF SPRAYBARS/TUBING

(75) Inventor: Meggan Harris, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 1214 days.

(21) Appl. No.: 11/376,634

(22) Filed: Mar. 14, 2006

(65) Prior Publication Data

US 2007/0214793 A1 Sep. 20, 2007

(51) Int. Cl.
*F02K 3/10* (2006.01)

(52) U.S. Cl. .......................................... 60/761; 60/765
(58) Field of Classification Search .................. 60/761, 60/765, 749, 750
See application file for complete search history.

(56) References Cited

U.S. PATENT DOCUMENTS

| | | | | |
|---|---|---|---|---|
| 3,314,860 A | * | 4/1967 | Wilman | 376/442 |
| 3,750,402 A | * | 8/1973 | Vdoviak et al. | 60/762 |
| 4,775,509 A | * | 10/1988 | Noailly et al. | 376/442 |
| 5,259,009 A | * | 11/1993 | Patterson et al. | 376/442 |
| 5,297,391 A | * | 3/1994 | Roche | 60/761 |
| 5,385,015 A | * | 1/1995 | Clements et al. | 60/765 |
| 5,396,763 A | * | 3/1995 | Mayer et al. | 60/765 |
| 5,685,140 A | * | 11/1997 | Clements et al. | 60/765 |
| 6,041,590 A | * | 3/2000 | Hayton et al. | 60/766 |
| 2006/0032231 A1 | * | 2/2006 | Andersson et al. | 60/765 |
| 2007/0006590 A1 | * | 1/2007 | Muldoon et al. | 60/761 |

* cited by examiner

*Primary Examiner*—Ted Kim
(74) *Attorney, Agent, or Firm*—Carlson, Gaskey & Olds PC

(57) ABSTRACT

A turbine engine trailing edge box for an afterburner has corrugations formed to guide and support a spraybar. The trailing edge box is formed of sheet metal to create corrugations in the walls. The spraybar is supported and guided by the corrugations. The corrugations are shaped and sized to hold the spraybar, but to prevent shifting of the spraybar during engine operation. In addition, the corrugations reinforce the walls of the trailing edge box to provide structural support.

17 Claims, 6 Drawing Sheets

STRUCTURAL TRACK SUPPORT OF SPRAYBARS/TUBING

The US Government may have certain rights in this invention in accordance with Contract Number N00019-02-C-3003 awarded by the United States Navy.

BACKGROUND OF THE INVENTION

The invention generally relates to an arrangement to guide and support a fuel conduit within a turbine engine. More particularly, this invention relates to a structural support for spraybars within a trailing edge box.

Turbine engines may have afterburners, or augmenters, located at the rear of the engine before an exhaust nozzle. Afterburners utilize unused oxygen from the turbine engine to obtain a second combustion. The second combustion provides additional thrust for the turbine engine. An afterburner includes trailing edge boxes that house fuel spraybars. The fuel spraybars are located in the trailing edge boxes to spray fuel where it can mix with unused oxygen.

Turbine engines and afterburners are subject to heavy vibrations, which may cause high wear on the engine and afterburner components. The hostile environment requires support for the fuel spraybars and other components. Typically, the trailing edge boxes are formed from a metal casting to provide a surface for supporting the spraybar. In order to provide the required support and structure the metal casting has thick walls which result in a heavy component. The fuel spraybars and related tubing are mounted adjacent to each trailing edge box for support. The fuel spraybars and tubing are usually attached to the trailing edge boxes with brackets for support and guidance, and to limit the motion of the fuel spraybars and tubing during operation.

A lighter arrangement to guide and support spraybars in a turbine engine is desirable.

SUMMARY OF THE INVENTION

An example trailing edge box for an afterburner according to this invention includes corrugations that guide and support a spraybar.

An afterburner for a turbine engine has multiple trailing edge boxes to house afterburner components. Each trailing edge box includes a spraybar providing fuel to mix with leftover oxygen for a second combustion.

Each trailing edge box is formed of sheet metal having corrugations formed in the walls. The spraybar includes features that mate to the corrugated inner walls of the trailing edge box. The mating configuration between the spraybar and the corrugations hold the spraybar to prevent shifting during engine operation. The corrugations not only support and guide the spraybar, but also reinforce the walls of the trailing edge box.

Accordingly, the example trailing edge box of this invention supports and guides the spraybars while providing a lighter more rigid assembly.

These and other features of the present invention can be best understood from the following specification and drawings, the following of which is a brief description.

DETAILED DESCRIPTION OF THE PREFERRED EMBODIMENT

Figure 1:
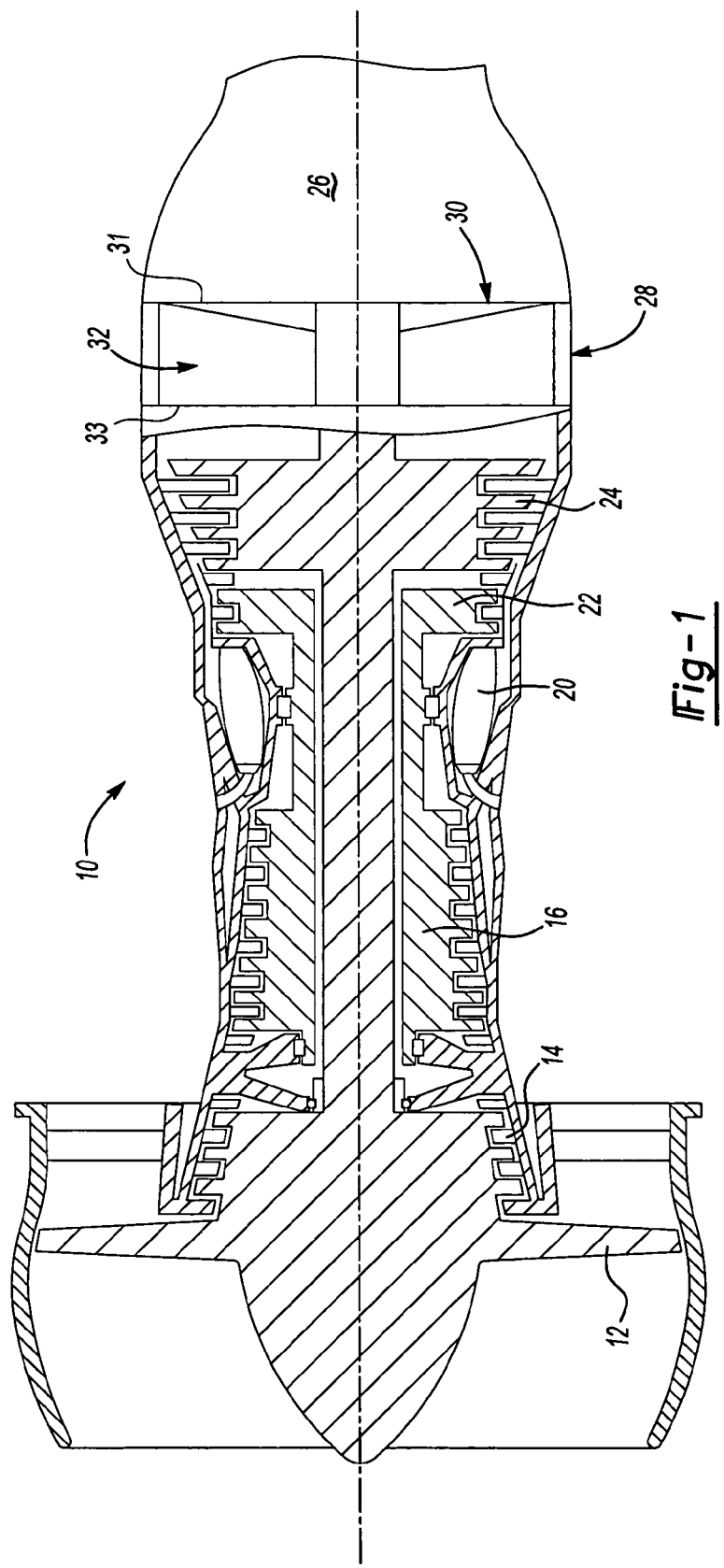
FIG. 1 is a schematic view of a turbine engine with an afterburner.

FIG. 1 is a schematic view of a turbine engine 10. Air is pulled into the turbine engine 10 by a fan 12 and flows through a low pressure compressor 14 and a high pressure compressor 16. Fuel is mixed with the oxygen and combustion occurs within the combustor 20. Exhaust from combustion flows through a high pressure turbine 22 and a low pressure turbine 24 prior to leaving the engine through the exhaust nozzle 26. The example engine 10 includes an afterburner, or augmenter, 30. A turbine exhaust case 28 is located in front of the exhaust nozzle 26 and behind the low pressure turbine 24 to house the afterburner 30.

Figure 2:
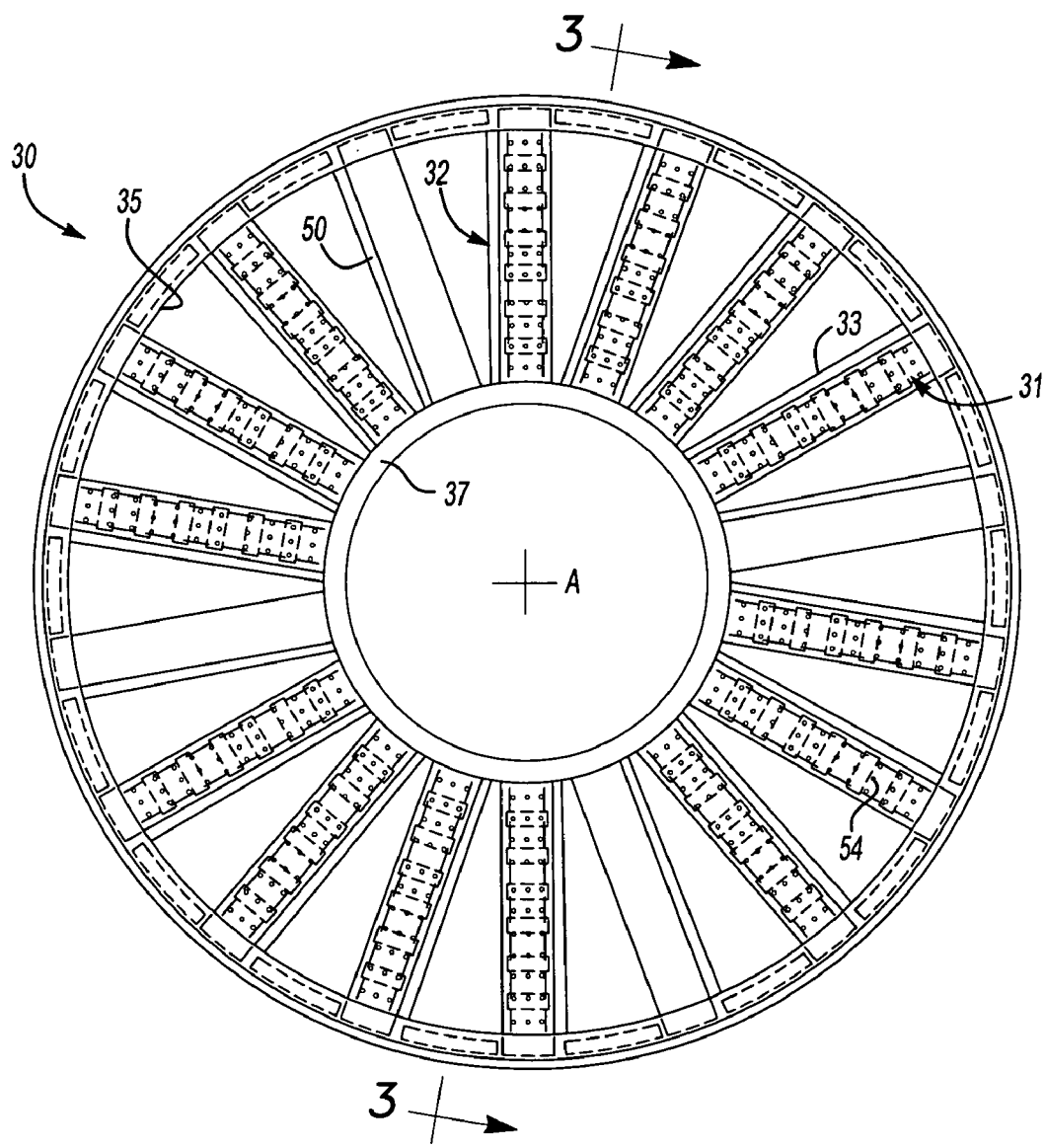
FIG. 2 is an end view of the afterburner showing trailing edge boxes according to this invention.
Figure 3:
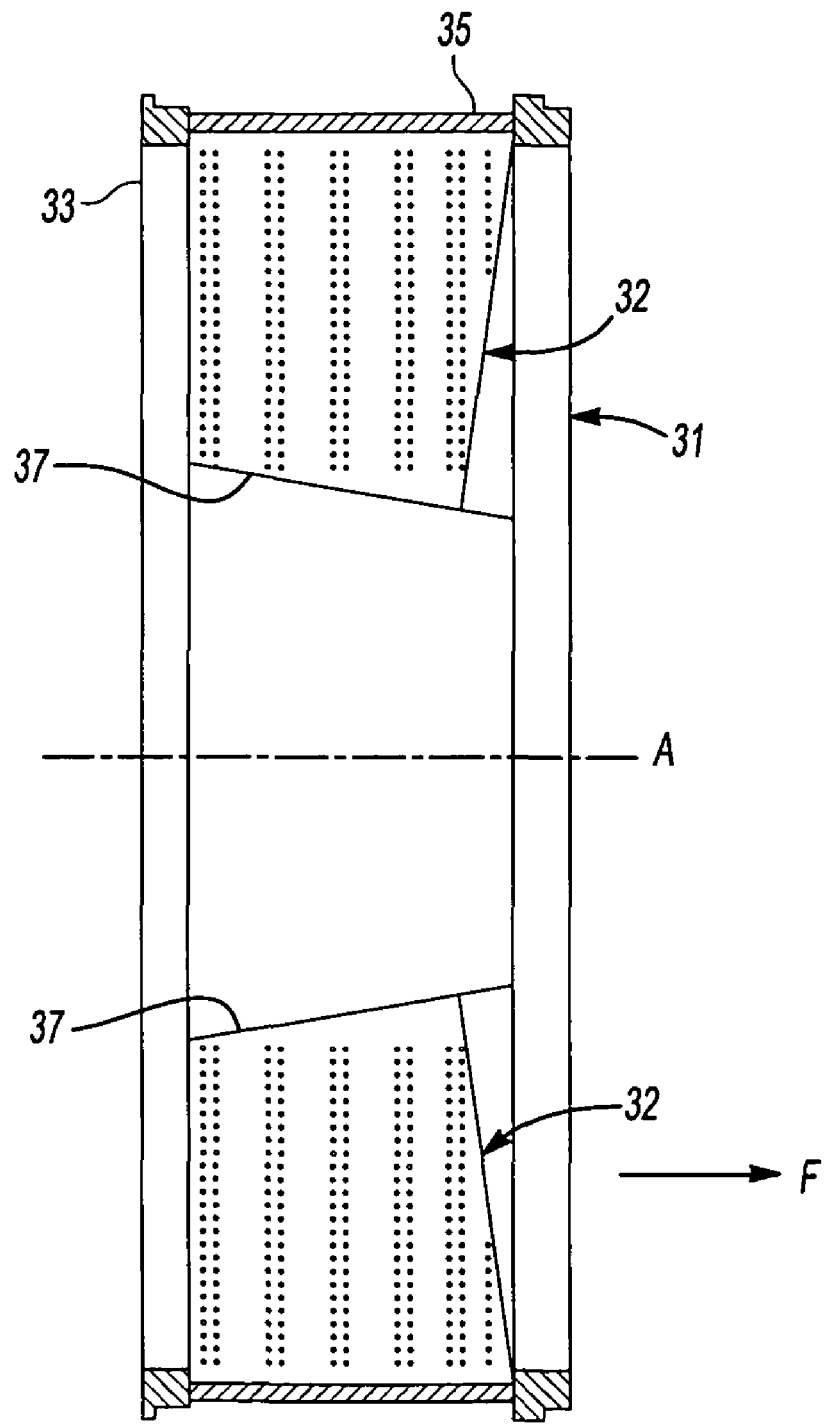
FIG. 3 is a cross-section of the afterburner showing the trailing edge boxes.

Referring to FIGS. 2 and 3, an end view of the afterburner 30 looking forward in the engine 10 and a cross-section of the afterburner 30 are shown. An afterburner trailing edge 31 is located at the aft end of the afterburner 30 and an afterburner leading edge 33 is located at the forward edge of the afterburner 30. Air flows, depicted by arrow F, into the afterburner 30 at the leading edge 33 and exits at the trailing edge 31. The afterburner 30 includes vanes 50 positioned between an outer case 35 and an inner case 37 to support the inner case 37. The afterburner 30 has trailing edge boxes 32 that house afterburner components. The trailing edge boxes 32 are positioned between the outer case 35 and an inner case 37 similar to the vanes 50. The trailing edge boxes are radially spaced about the inner case 35. The trailing edge boxes 32 are symmetrically disposed about an axis A of the engine and about the outer case 35 and interposed with the vanes 50.

Figure 4:
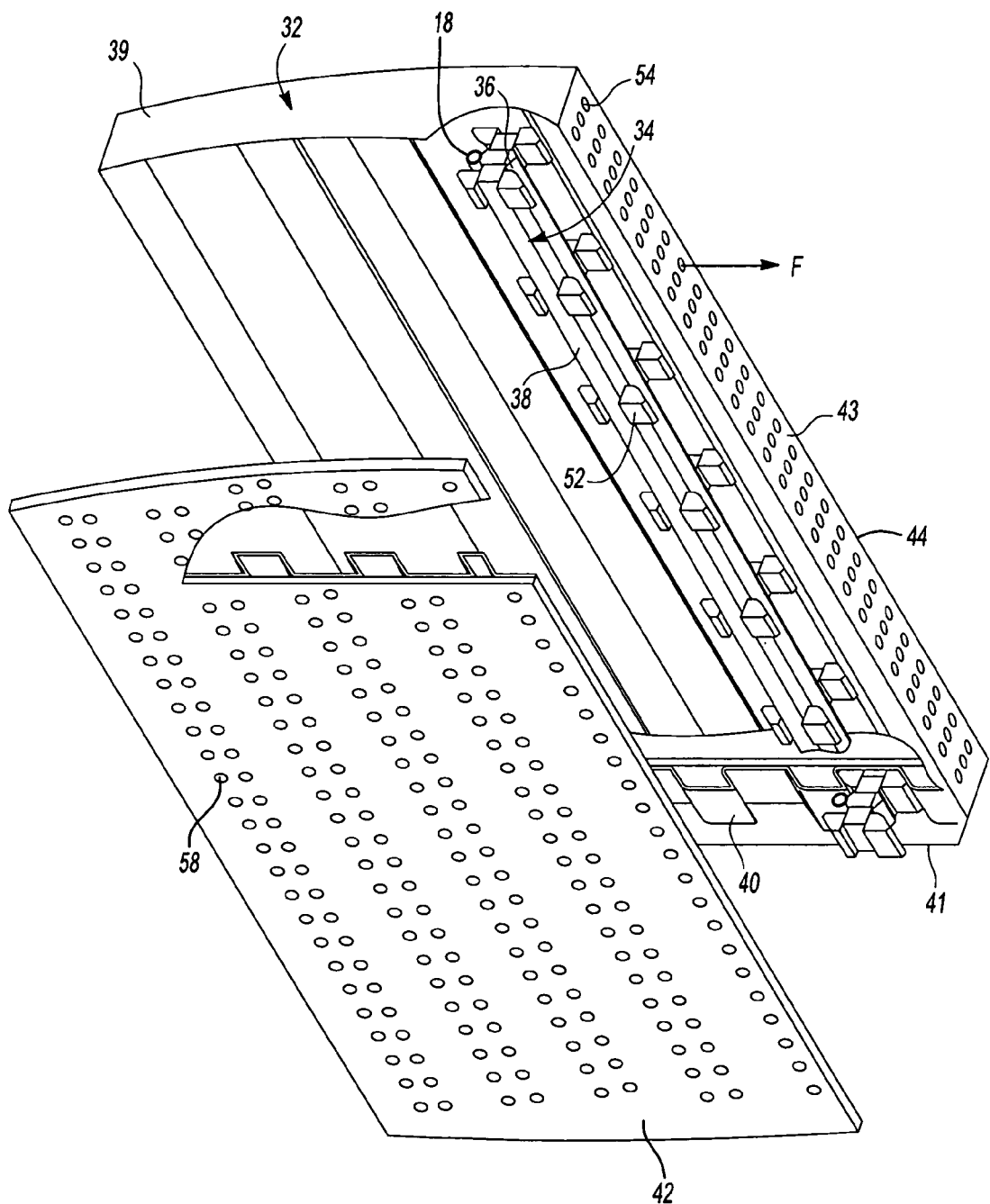
FIG. 4 is an interior view of a trailing edge box of the present invention.

FIG. 4 shows an interior view of one trailing edge box 32. An afterburner spraybar 34 is housed within the trailing edge box 32 and provides fuel to mix with the leftover oxygen for a second combustion. The afterburner spraybar 34 extends radially within the afterburner 30 between the inner case 35 and the outer case 37. The afterburner spraybar 34 includes support lines 38 extending the length of the trailing edge box 32. A fuel conduit 18 is supported on the support lines 38. A plurality of diffusers 36 are spaced on the support lines 38. The diffusers 36 emit fuel, supplied by the fuel conduit 18, to mix with air for combustion. Supports 52 are also disposed along the length of the support lines 38. The supports 52 mate with the trailing edge box 32 to support and guide the afterburner spraybar 34.

Cooling holes 58 are located on a first wall 42 and a second wall 44 of the trailing edge box 32 to allow oxygen to enter the trailing edge box 32. The exhaust from the second combustion leaves the trailing edge box 32 through exhaust holes 54 on a trailing edge side 43 of the trailing edge box 32. Exhaust flow is depicted by arrow F. The second combustion provides additional thrust to the turbine engine 10. Exhaust from the first and second combustion exits the turbine engine 10 through the exhaust nozzle 26 (shown in FIG. 1).

The example trailing edge box 32 is formed of sheet metal. The sheet metal is formed to create corrugations 40 on the internal side of the first wall 42 and the second wall 44 of the trailing edge box 32. The first wall 42 and the second wall 44 are opposing sides of the trailing edge box 32. When the trailing edge box 32 is assembled the corrugations from each side face one another running laterally from an outer case edge 39 toward an inner case edge 41. The corrugations 40 may be formed as one piece with the first wall 42 and the second wall 44 or may be separate pieces of sheet metal which are attached to the first wall 42 and the second wall 44. The afterburner spraybar 34 is supported and guided by the corrugations 40 near the trailing edge side 43 of the trailing edge box 32. Although there is only one afterburner spraybar 34 in each trailing edge box other corrugations 40 within the trailing edge box provide structural support.

Figure 5:
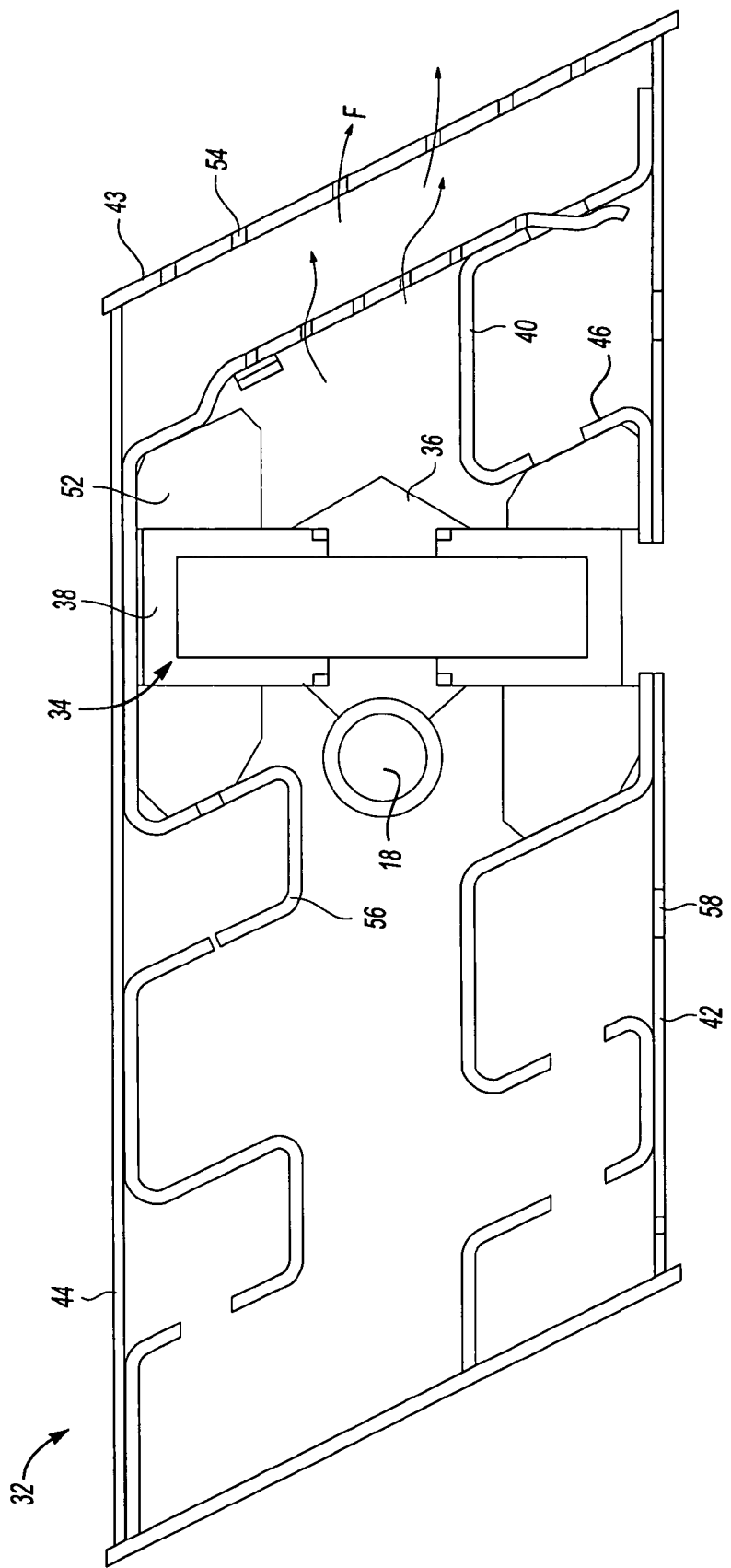
FIG. 5 is a cross-sectional view of an example trailing edge box of the present invention.

FIG. 5 shows a cross-section through the trailing edge box 32 looking from the outer case 35 toward the inner case 37 (shown in FIG. 2). Air flows through the trailing edge box 32 to exit from the trailing edge side 43, depicted by arrow F. The corrugations 40 are shaped and sized to hold the supports 52 attached to the support lines 38 of the afterburner spraybar 34. The supports 52 are shaped to mate to the corrugations 50. The corrugations 40 are sized large enough to house the afterburner spraybar 34 but small enough to prevent shifting of the afterburner spraybar 34 during engine 10 operation. The shape of the corrugations 40 may vary to reflect the shape of the afterburner spraybar 34.

The example supports 52 have a generally square shape. The corrugations 40 have U-shaped cross-section with the internal side of the first wall 42 and the second wall 44 crossing the opening of the U-shape. The U-shape of the corrugations 40 includes generally straight sides 46 extending from the first wall 42 or the second wall 44 of the trailing edge box 32. The sides 46 extend at an angle that corresponds to an angle of the support 52. However, at least one of the sides 46 is not perpendicular to either of the side walls 42, 44 (e.g., the angle between at least one of the sides and either of the first and second walls is not 90°). Load on the trailing edge box 32 forces the first wall 42 and the second wall 44 away from each other, as a result the angle of the sides 46 places pressure on the supports 52 of the afterburner spraybar 34. The interference fit prevents shifting of the afterburner spraybar 34. The corrugation 40 has rounded corners 56 that substantially prevents formation of high stress areas.

The corrugations 40 are sized and shaped to support the afterburner spraybar 34 and prevent shifting caused by vibrations during engine 10. The corrugations 40 also align the afterburner spraybar 34 within the trailing edge box 32. In addition, the corrugations 40 strengthen the walls of the trailing edge box 32. However, the corrugations extending from one side wall form a pattern that does not align with the corrugations forming a similar pattern on the other side wall.

The example corrugations are located in the trailing edge box 32 within the afterburner 30 to support the afterburner spraybar 34. Although the example corrugations 40 provide support and alignment for the afterburner spraybar 34 within the trailing edge box 32, the corrugations 40 could be sized and shaped to provide support for other tubing or components as required.

Figure 6:
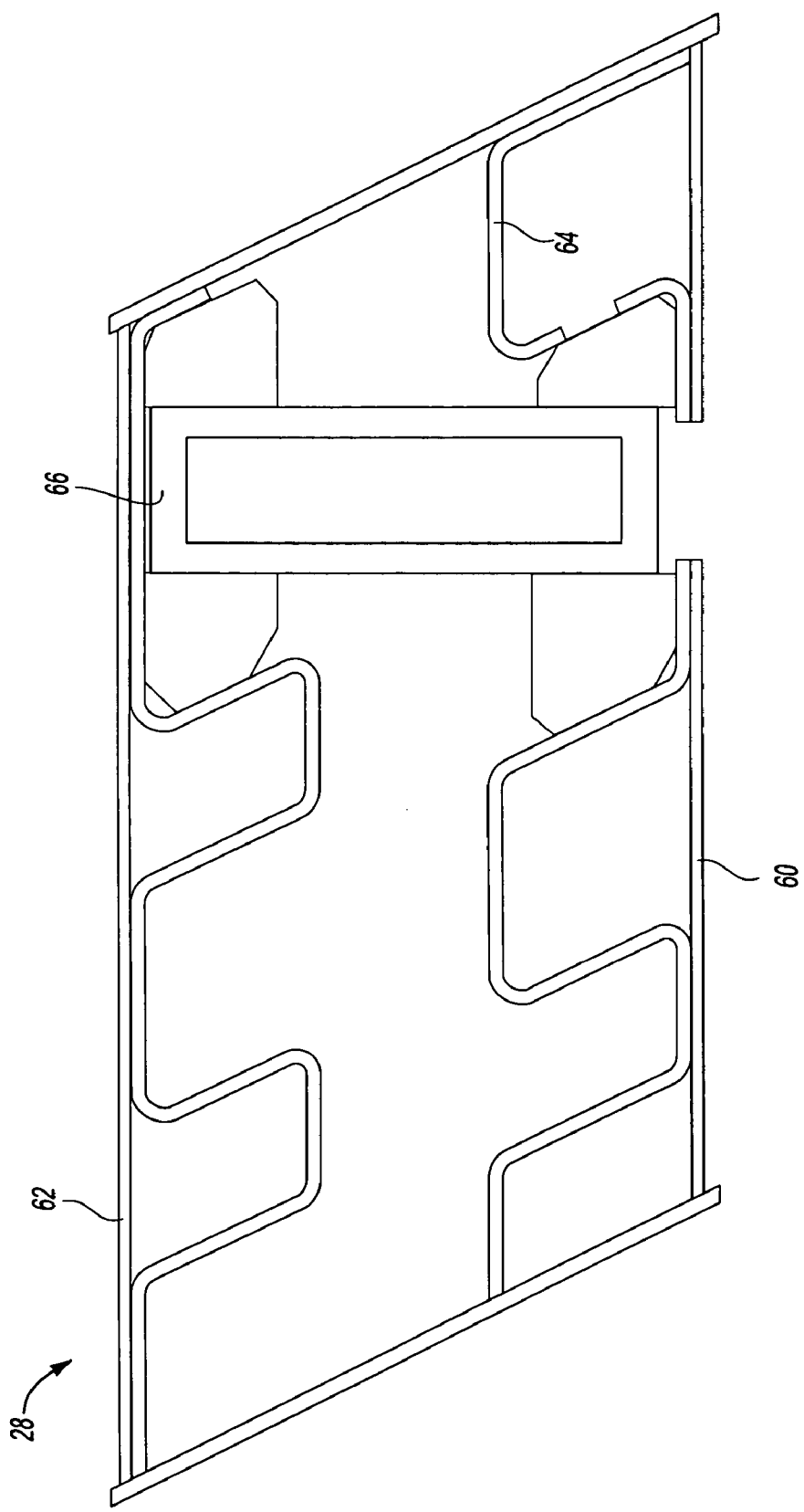
FIG. 6 is a cross-sectional view of an example turbine exhaust case of the present invention.

Referring to FIG. 6, a cross-section through an example of the turbine exhaust case 28 (shown in FIG. 1) includes an inner wall 60 and an outer wall 62. Corrugations 64 are formed on an interior side of the inner wall 60 and an interior side of the outer wall 62 of the turbine exhaust case 28 to house fuel lines 66. The corrugations 64 may be formed as one piece with the inner wall 60 and the outer wall 62, or may be separate pieces of sheet metal which are attached to the inner wall 60 and the outer wall 62. The corrugations 64 in the turbine exhaust case 28 run axially within the engine 10 and the fuel lines 66 provide fuel to the components of the engine 10, such as the afterburner spraybar 34. The corrugations 64 support and retain the fuel lines 66 to protect the fuel lines from vibration and also provide structure for the turbine exhaust case 28.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. Turbine engine comprising:
    a spray bar having a longitudinal axis,
    a trailing edge box including a corrugation, said corrugation having a pair of generally parallel sidewalls, parallel being defined in a plane transverse to the longitudinal axis, and
    a connecting wall connecting said side walls to form said corrugation wherein said at least one of said side walls form a not perpendicular angle to said connecting wall,
    wherein said corrugation supports said spray bar and said not perpendicular angle minimizes shifting of said spray bar during engine operation.

2. The turbine engine of claim 1, wherein said corrugation strengthens a member of said trailing edge box.

3. The turbine engine of claim 1, where said corrugation is mounted on an inner surface of said trailing edge box.

4. The turbine engine of claim 3, wherein a first corrugation and a second corrugation are mounted on opposing inner surfaces of said trailing edge box.

5. The turbine engine of claim 4, wherein said spray bar further comprises supports that mate with said first corrugation and said second corrugation to retain said spray bar within said trailing edge box.

6. The turbine engine of claim 1 wherein a first corrugation and a second corrugation are mounted on opposing inner surfaces of said trailing edge box.

7. The turbine engine of claim 6 wherein said spray bar further comprises supports that mate with said first corrugation and said second corrugation to retain said spray bar within said trailing edge box as said opposing inner surfaces move.

8. The turbine engine of claim 7 wherein mating of said supports with said first corrugation and said second corrugation minimizes said opposing inner surfaces from moving away from each other.

9. The turbine engine of claim 6 wherein said first corrugation and said second corrugation do not align with each other.

10. The turbine engine of claim 1 wherein said corrugation has rounded corners.

11. A turbine engine afterburner comprising:
    a supply component having a longitudinal axis, a housing including a roughly u-shaped corrugation, said corrugation having
    a pair of generally parallel sidewalls, parallel being defined in a plane transverse to the longitudinal axis, and
    a connecting wall connecting said side walls to form said roughly u-shaped corrugation wherein at least one of said side walls form a not perpendicular angle to said connecting wall, wherein said corrugation supports said supply component and said not perpendicular angle minimizes shifting of said supply component during afterburner operation.

12. The turbine engine afterburner of claim 11, wherein supports on said supply component mate with said corrugation to retain said supply component within said housing.

13. The turbine engine of claim 12 wherein a first corrugation and a second corrugation are mounted on opposing inner surfaces of said housing.

14. The turbine engine of claim 13 wherein said supply component further comprises supports that mate with said first corrugation and said second corrugation to retain said supply component within said housing.

15. The turbine engine of claim 14 wherein mating of said supports with said first corrugation and said second corrugation minimizes said opposing inner surfaces from moving away from each other.

16. The turbine engine of claim 11, wherein a first corrugation and a second corrugation are mounted on opposing inner surfaces of said housing.

17. The turbine engine of claim 16, wherein said supply component comprises supports that mate with said a first corrugation and said second corrugation to retain said supply component within said trailing edge box.

\* \* \* \* \*